(12) United States Patent
Ishikawa

(10) Patent No.: US 6,776,581 B2
(45) Date of Patent: Aug. 17, 2004

(54) METHOD OF CONNECTING A STARTER RING GEAR WITH A CONVERTER COVER AND A TORQUE CONVERTER INCLUDING A STARTER RING GEAR CONNECTED WITH A CONVERTER COVER BY THE METHOD

(75) Inventor: Masanori Ishikawa, Shizuoka (JP)

(73) Assignee: Jatco LTD, Fuji (JP)

( * ) Notice: Subject to any disclaimer, the term of this patent is extended or adjusted under 35 U.S.C. 154(b) by 143 days.

(21) Appl. No.: 10/252,090

(22) Filed: Sep. 23, 2002

(65) Prior Publication Data

US 2003/0061808 A1 Apr. 3, 2003

(30) Foreign Application Priority Data

Sep. 28, 2001 (JP) ........................................ 2001-303921

(51) Int. Cl.[7] ............................................... F16H 41/24
(52) U.S. Cl. ...................................... 416/180; 29/889.5
(58) Field of Search ............................ 416/170 R, 180, 416/197 C; 415/122.1; 29/889.5, 505

(56) References Cited

U.S. PATENT DOCUMENTS

| | | | | |
|---|---|---|---|---|
| 3,838,611 A | * | 10/1974 | Koivunen | ..................... 475/59 |
| 4,378,870 A | * | 4/1983 | McRae | ..................... 192/3.24 |
| 5,813,505 A | * | 9/1998 | Olsen et al. | ............... 192/3.28 |

* cited by examiner

Primary Examiner—Ninh H. Nguyen
(74) Attorney, Agent, or Firm—Foley & Lardner LLP

(57) ABSTRACT

A method of connecting a starter ring gear connected with a converter cover, and a torque converter including a starter ring gear connected with a converter cover by the method. The method includes setting the starter ring gear at a corner portion of the converter cover in alignment with each other, and producing a plastic flow of metal at the corner portion thereof, the plastic flow of metal forming an engaging member disposed on an outer circumferential surface of a cylindrical wall of the converter cover and engaged with an engaging member disposed on an inner circumferential surface of the starter ring gear, to thereby connect the starter ring gear with the converter cover. The starter ring gear and the converter cover are rotatable about a rotation axis. The corner portion of the converter cover is formed between the cylindrical wall and a disk wall connected therewith.

16 Claims, 6 Drawing Sheets

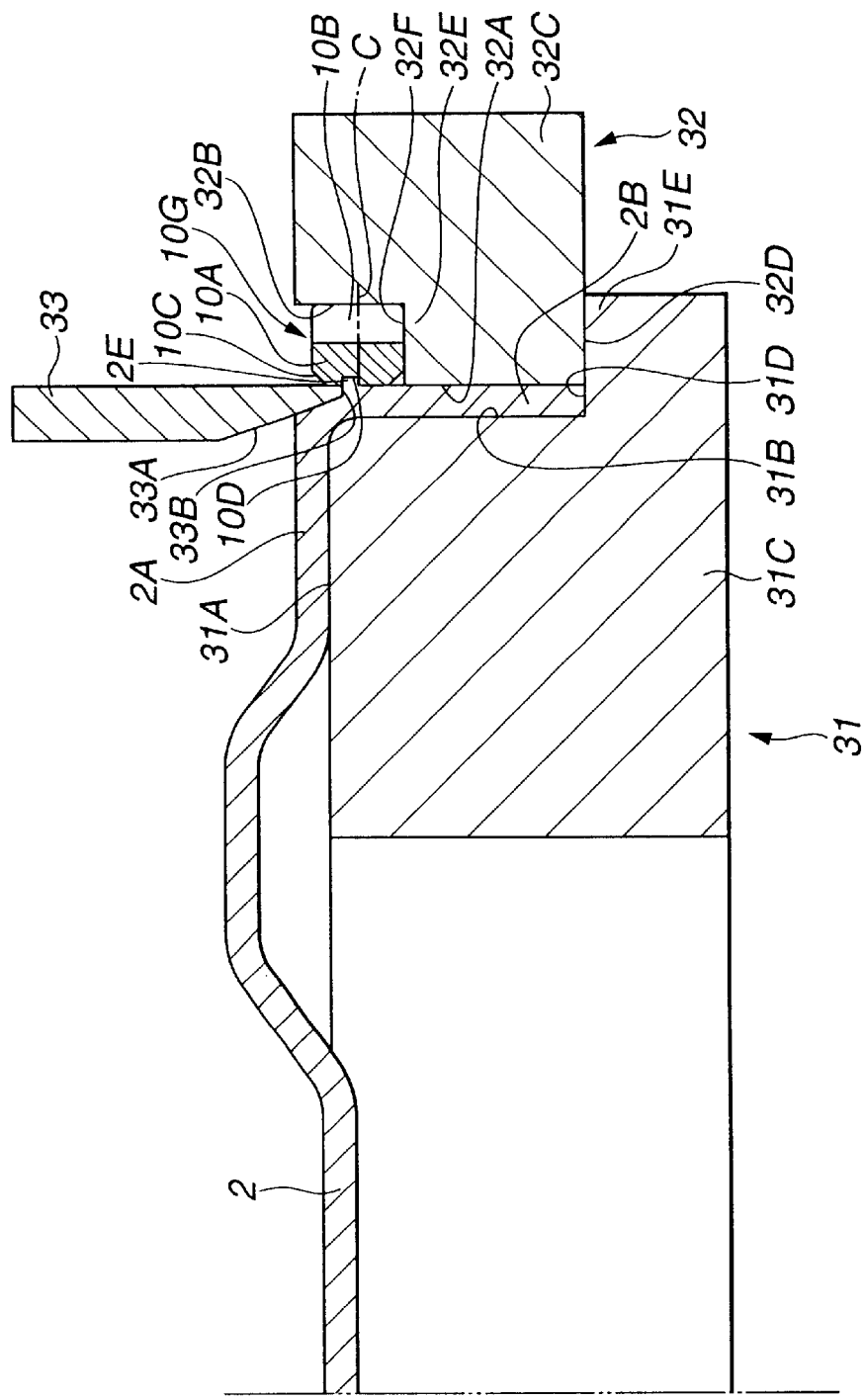

METHOD OF CONNECTING A STARTER RING GEAR WITH A CONVERTER COVER AND A TORQUE CONVERTER INCLUDING A STARTER RING GEAR CONNECTED WITH A CONVERTER COVER BY THE METHOD

BACKGROUND OF THE INVENTION

The present invention relates to a torque converter (T/C) including a converter cover to which power is transmitted from a rotation drive source such as an engine, and specifically to a T/C in which a starter ring gear for initiating the rotation drive source is firmly connected with a converter cover.

A T/C of a related art is shown in FIG. 4. As illustrated in FIG. 4, converter cover 54 of torque converter 53 is connected with drive plate 51 via connection 52 therebetween. Drive plate 51 is connected with an engine output shaft. Starter ring gear 55 is welded at 56 to an outer circumferential surface of converter cover 54. Starter ring gear 55 is driven by a starter motor by meshing with a pinion mounted to the starter motor.

SUMMARY OF THE INVENTION

If a rim of starter ring gear 55 has a relatively small thickness, teeth formed on an outer circumferential surface of starter ring gear 55 will be readily heated by heat produced upon welding, and then be cooled down to ordinary temperature. As a result, the teeth of the starter ring gear 55 is annealed so that the rigidity will be deteriorated. This will facilitate abrasion of the teeth of the starter ring gear 55 which is caused by meshing with the pinion mounted to the starter motor.

It would threrefore be desirable to provide a method of connecting a starter ring gear with a converter cover within a T/C without using welding. The method can prevent the starter ring gear from being deteriorated in rigidity due to annealing after welding, serving for reducing abrasion of teeth of the starter ring gear which is caused upon meshing with a pinion of a starter motor. Further, it would be desirable to provide a T/C in which a starter ring gear is connected with a converter cover without using welding, whereby the starter ring gear can hold a good rigidity and can be less affected by abrasion of teeth thereof which is caused upon meshing with a pinion of a starter motor, so that the life of the starter ring gear can be prolonged.

In one aspect of the present invention, there is provided a method of connecting a starter ring gear with a converter cover within a torque converter, the starter ring gear being adapted for initiating a rotation drive source for the torque converter and rotatable about a rotation axis, the starter ring gear including a first engaging member disposed on an inner circumferential surface of the starter ring gear, the converter cover being rotatable about the rotation axis together with the starter ring gear, the converter cover including a cylindrical wall extending along the rotation axis, a disk wall connected with an axial end of the cylindrical wall to form a corner portion therebetween, and a second engaging member which is engaged with the first engaging member and disposed on an outer circumferential surface of the cylindrical wall, the method comprising:

setting the starter ring gear at the corner portion between the disk wall and the cylindrical wall of the converter cover in alignment with each other; and producing a plastic flow of metal at the corner portion between the disk wall and the cylindrical wall of the converter cover, the plastic flow of metal forming the second engaging member engaged with the first engaging member, to thereby connect the starter ring gear with the converter cover.

In a further aspect of the present invention, there is provided a torque converter in connection with a rotation drive source, the torque converter including a starter ring gear adapted for initiating the rotation drive source and rotatable about a rotation axis, the starter ring gear including a first engaging member disposed on an inner circumferential surface of the starter ring gear, and a converter cover rotatable about the rotation axis together with the starter ring gear, the converter cover including a cylindrical wall extending along the rotation axis, a disk wall connected with an axial end of the cylindrical wall to form a corner portion therebetween, and a second engaging member which is engaged with the first engaging member and disposed on an outer circumferential surface of the cylindrical wall, the starter ring gear being connected with the converter cover by a method comprising:

setting the starter ring gear at the corner portion between the disk wall and the cylindrical wall of the converter cover in alignment with each other; and producing a plastic flow of metal at the corner portion between the disk wall and the cylindrical wall of the converter cover, the plastic flow of metal forming the first engaging member engaged with the second engaging member, to thereby connect the starter ring gear with the converter cover.

BRIEF DESCRIPTION OF THE DRAWINGS

FIG. 2 is an explanatory enlarged section of the connecting structure, showing a process of producing a plastic flow of metal in the converter cover;

DETAILED DESCRIPTION OF THE PREFERRED EMBODIMENT

Figure 1:
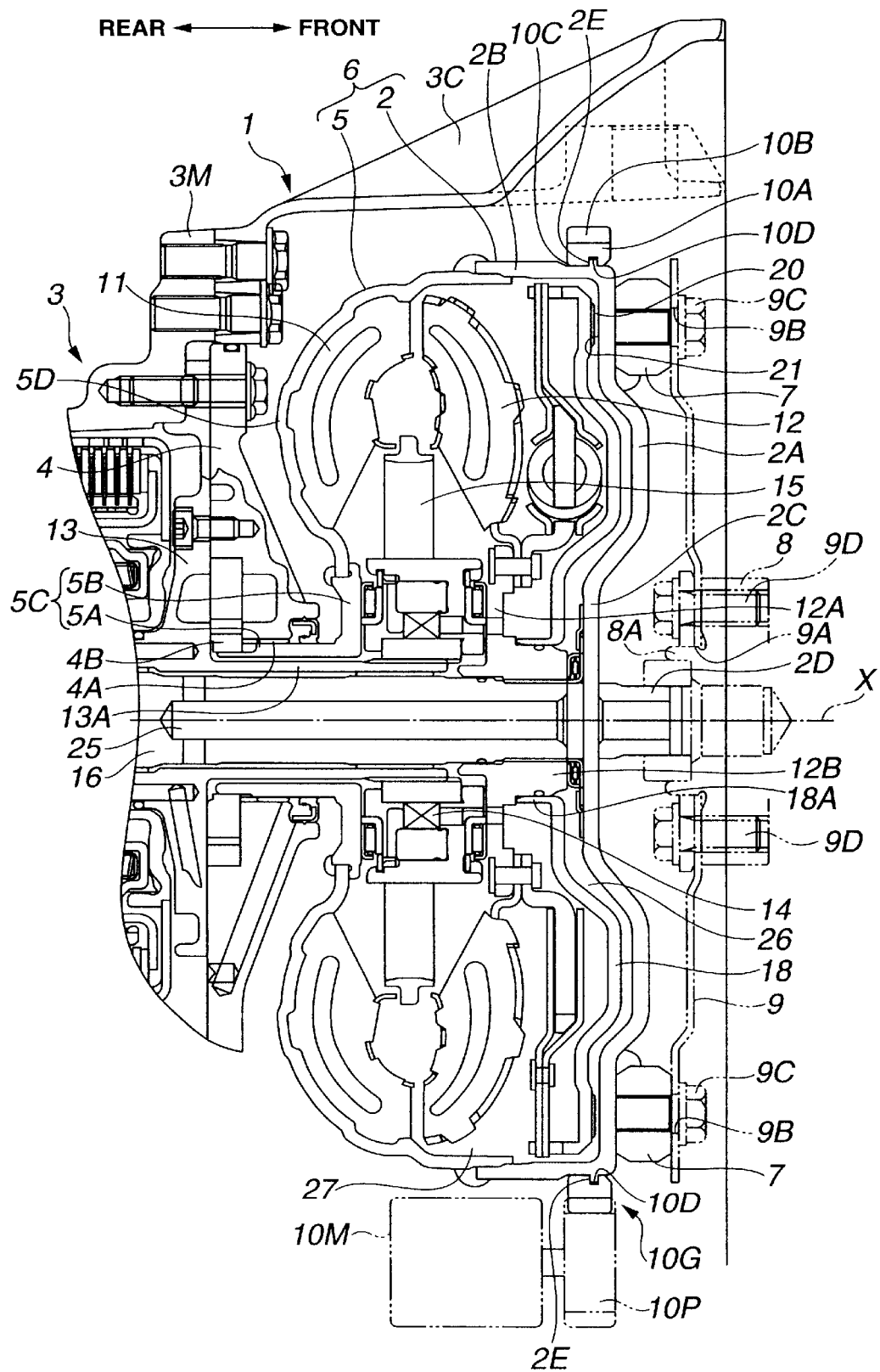
FIG. 1 is a longitudinal cross-section of a torque converter according to a first embodiment of the present invention, showing a connection of a starter ring gear with a converter cover.

Referring now to FIG. 1, there is shown a torque converter (T/C) 1 of a first embodiment of the present invention. As illustrated in FIG. 1, the torque converter 1 includes a converter cover 6 rotatable about a rotation axis X. The converter cover 6 is constituted of a front cover 2 and a rear cover 5. The front cover 2 is connected on the front side with a rotation drive source, namely, an engine crankshaft 8 (engine output shaft) in this embodiment, and connected on the rear side with the rear cover 5. The rear cover 5 is rotatably supported on an oil pump case 4 which is mounted to a front end face of a transmission case 3M of an automatic transmission (A/T) 3. The converter cover 6 is disposed within a converter housing 3C connected with the front end face of transmission case 3M.

Specifically, the front cover 2 includes a disk wall 2A and a cylindrical wall 2B connected with the disk wall 2A. The cylindrical wall 2B extends rearward from an outer circumferential portion of the disk wall 2A along the rotation axis X. A corner portion is formed at the connecting portion between the disk wall 2A and the cylindrical wall 2B. The disk wall 2A includes an outer peripheral wall portion and a rearward recessed center wall portion 2C which is rearward offset from the outer peripheral wall portion. The disk wall 2A has a shaft portion 2D forward extending from a central portion of the recessed center wall portion 2C. Nuts, four nuts in this embodiment, are arranged on a front surface of the outer peripheral wall portion of the disk wall 2A in a circumferentially spaced relation to each other and welded thereto. A drive plate 9 is connected with the front cover 2 by the nuts 7 and bolts 9C screwed into the nuts 7. The bolts 9C extend through mount holes 9B which are formed in an outer peripheral portion of the drive plate 9 in alignment with the nuts 7. The drive plate 9 is connected with the engine crankshaft 8 via bolts 9D screwed into the engine crankshaft 8 and a projecting portion 8A of the engine crankshaft 8 inserted into an insertion hole 9A of the drive plate 9.

A starter ring gear 10G is coaxially disposed on the cylindrical wall 2B of the front cover 2 near the corner portion between the disk wall 2A and the cylindrical wall 2B. The starter ring gear 10G is operatively connected with a starter motor 10M arranged within the converter housing 3C. The starter ring gear 10G meshes with a pinion 10P mounted to an output shaft of the starter motor 10M. The starter ring gear 10G includes a ring portion 10A having a generally rectangular section, and teeth 10B formed on an outer circumferential surface of the ring portion 10A. The ring portion 10A has an inner diameter substantially same as an outer diameter of the cylindrical wall 2B of the front cover 2. The teeth 10B are formed by rolling or machining. As illustrated in FIG. 2, the ring portion 10A has chamfered portions 10C at axially opposed ends of an inner circumferential surface thereof. The ring portion 10A has an engaging member for connecting the starter ring gear 10G with the front cover 2. In this embodiment, the engaging member is in the form of a circumferential recess 10D circumferentially continuously extending in the inner circumferential surface of the starter ring gear 10G. The circumferential recess 10D is located in an axially offset position in the inner circumferential surface of the starter ring gear 10G. The offset position is a front side position of the starter ring gear 10G shown in FIG. 1, which is axially offset from a plane C extending perpendicular to the rotation axis X through a mid-point of an axially extending width of the starter ring gear 10G, to the side of the disk wall 2A. In the connecting state of the starter ring gear 10G relative to the front cover 2, the circumferential recess 10D is located in an opposed relation to an outer circumferential surface of the cylindrical wall 2B near the corner portion between the disk wall 2A and the cylindrical wall 2B. The circumferential recess 10D is engaged with a circumferential projection 2E formed on the outer circumferential surface of the cylindrical wall 2B of the front cover 2. The circumferential projection 2E extends radially outward from the outer circumferential surface of the cylindrical wall 2B and circumferentially therealong. The circumferential projection 2E thus acting as an engaging member for connecting the starter ring gear 10G with the front cover 2 in cooperation with the circumferential recess 10D.

A method of connecting the starter ring gear 10G with the cylindrical wall 2B of the front cover 2 will be explained hereinafter. The connection is conducted using an inner jig 31, an outer jig 32 and a punch 33. As illustrated in FIG. 2, the inner jig 31 has a generally ring-shaped body 31C which is formed with a step portion 31E in an outer circumferential surface thereof. The ring-shaped body 31C has a radially extending engaging surface 31A at one end thereof and a circumferentially extending engaging surface 31B connected with the radially extending engaging surface 31A via a corner engaging surface therebetween. When the front cover 2 is placed on the inner jig 31, the radially extending engaging surface 31A is engaged with a rear surface of the disk wall 2A of the front cover 2, and the circumferentially extending engaging surface 31B is engaged with an inner circumferential surface of the cylindrical wall 2B of the front cover 2. The corner engaging surface is engaged with an inner surface of the corner portion between the disk wall 2A and the cylindrical wall 2B upon placing the front cover 2 on the inner jig 31. The ring-shaped body 31C also has a radially extending engaging surface 31D defined by the step portion 31E. The radially extending engaging surface 31D has a portion engageable with a rear end face of the cylindrical wall 2B of the front cover 2.

The outer jig 32 has a generally ring-shaped body 32C which is formed with a step portion 32E in an inner circumferential surface thereof. The ring-shaped body 32C has a radially extending engaging surface 32D at one end thereof. The radially extending engaging surface 32D is engaged with the radially extending engaging surface 31D of the ring-shaped body 31C of the inner jig 31 when the outer jig 32 is placed on the inner jig 31. The ring-shaped body 32C has an inner circumferentially extending engaging surface 32A, an outer circumferentially extending engaging surface 32B and a radially extending engaging surface 32F between the inner and outer circumferentially extending engaging surfaces 32A and 32B. The outer circumferentially extending engaging surface 32B and the radially extending engaging surface 32F are defined by the step portion 32E. The inner circumferentially extending engaging surface 32A is engaged with the outer circumferential surface of the cylindrical wall 2B of the front cover 2 when the radially extending engaging surface 32D is engaged with the radially extending engaging surface 31D of the inner jig 31 carrying the front cover 2 thereon. The inner circumferentially extending engaging surface 32A is in alignment with an inner circumferential surface of the starter ring gear 10G when the starter ring gear 10G is set on the step portion 32E. The outer circumferentially extending engaging surface 32B is engaged with an outer circumferential surface of the starter ring gear 10G when the starter ring gear 10G is set on the step portion 32E. The radially extending engaging surface 32F retains a rear end face of the starter ring gear 10G in contact therewith. The starter ring gear 10G is set on the radially extending engaging surface 32F such that the circumferential recess 10D of the starter ring gear 10G is opposed to the outer circumferential surface of the cylindrical wall 2B of the front cover 2 near the corner portion between the disk wall 2A and the cylindrical wall 2B when.

The punch 33 has a ring shape having substantially a same outer diameter as that of the cylindrical wall 2B of the front cover 2. The punch 33 has a tapered end portion having a thickness which decreases toward a lower distal end of the punch 33 as shown in FIG. 2. The tapered end portion is formed with a slant surface 33A and a planar end face 33B connected with the tapered surface 33A. The slant surface 33A is outward inclined such that an inner diameter of the tapered end portion gradually increases toward the distal end.

First, in the operation of connecting the starter ring gear 10G with the front cover 2, the front cover 2 is placed on the inner jig 31 in such a manner that the disk wall 2A and the cylindrical wall 2B of the front cover 2 are engaged with the radially extending engaging surface 31A and the circumferentially extending engaging surface 31B of the inner jig 31, respectively, and that a lower end face (a rear end face shown in FIG. 1) of the cylindrical wall 2B is engaged with the radially extending engaging surface 31D of the inner jig 31. The front cover 2 is retained on the inner jig 31. Next, the starter ring gear 10G is set on the step portion 32E of the outer jig 32 such that the circumferential recess 10D of the starter ring gear 10G is located on an upper side thereof as shown in FIG. 2. Subsequently, the outer jig 32 is placed on the step portion 31E of the inner jig 31 such that the inner circumferentially extending engaging surface 32A is engaged with the outer circumferential surface of the cylindrical wall 2B of the front cover 2, and that the radially extending engaging surface 32D is engaged with the radially extending engaging surface 31D of the inner jig 31.

Next, the punch 33 is positioned at the corner portion between the disk wall 2A and the cylindrical wall 2B of the front cover 2 so as to align an outer circumferential surface of the punch 33 with the outer circumferential surface of the cylindrical wall 2B. The punch 33 is downward driven to a position shown in FIG. 2, by a press, where the planar end face 33B is in radial alignment with an upper side surface of the circumferential recess 10D of the starter ring gear 10G as viewed in FIG. 2. The circumferential recess 10D extends circumferentially and radially outward from the inner circumferential surface of the starter ring gear 10G and is located on the disk wall 2A side in the axial direction of the front cover 2. Upon downward driving the punch 33, a plastic flow of metal is produced at the corner portion between the disk wall 2A and the cylindrical wall 2B of the front cover 2. The metal is forced to enter into the circumferential recess 10D of the starter ring gear 10G and form the circumferential projection 2E on the outer circumferential surface of the cylindrical wall 2B of the front cover 2. The circumferential projection 2E comes into integral engagement with the circumferential recess 10D. Thus, the starter ring gear 10G is integrally connected with the front cover 2 by the engagement between the circumferential projection 2E and the circumferential recess 10D.

Subsequently, the punch 33 is upward moved from the position shown in FIG. 2, so as to be released from the front cover 2. The inner jig 31 is then downward moved from the position shown in FIG. 2 until the circumferentially extending engaging surface 31B is disengaged from the inner circumferential surface of the cylindrical wall 2B. The front cover 2 connected with the starter ring gear 10G is upward moved to be released from the outer jig 32 by using a rammer, not shown, disposed on the inside of the inner jig 31. The front cover 2 integrally connected with the starter ring gear 10G is thus provided.

Referring back to FIG. 1, the rear cover 5 of the converter cover 6 includes an inner member 5C having a generally L-shaped section. The inner member 5C is constituted of a cylindrical portion 5A rotatably supported on an oil pump case 4 via a bushing 4A, and a disk portion 5B radially outward extending from a front end periphery of the cylindrical portion 5A. The cylindrical portion 5A is connected at a rear end thereof with an oil pump 4B within the oil pump case 4. The rear cover 5 also includes an outer member 5D which outward extends from an outer circumference of the disk portion 5B with rearward curving configuration, and then forward curves and secured at the front end thereof to the inside of the cylindrical wall 2B of the front cover 2. An inner circumference of the outer member 5D is welded to the outer circumference of the disk portion 5B. A front end portion of the outer member 5D is fixed to the inner circumferential surface of the cylindrical wall 2B of the front cover 2 by welding.

A pump impeller 11 is connected to an inner circumferential surface of the outer member 5D of the rear cover 5. A turbine runner 12 is disposed in opposed relation to the pump impeller 11 within the converter cover 6. A stator blade 15 is disposed between the pump impeller 11 and the turbine runner 12. The stator blade 15 is connected with a sleeve 13A of an oil pump cover 13 via a one-way clutch 14. The oil pump cover 13 is joined with the oil pump case 4 to cover the rear side thereof. The turbine runner 12 has a turbine hub 12A splined to a rotating shaft 16 of the A/T 3 which is rotatably supported on a transmission case 3M. The rotating shaft 16 is coaxially arranged with the converter cover 6, the pump impeller 11, the turbine runner 12 and the stator blade 15. A lockup piston 18 is disposed between the front cover 2 and the turbine runner 12. The lockup piston 18 has an engaging sleeve 18A at a central part thereof which is moveably engaged with a cylindrical portion 12B of the turbine hub 12A. The lockup piston 18 is axially moveable on the cylindrical portion 12B and rotatable therewith. A lockup facing member (lockup clutch) 20 is disposed on a front surface of an outer peripheral portion of the lockup piston 18. The lockup facing member 20 is opposed to a planar surface 21 extending perpendicular to the rotation axis X on the rear side of the outer peripheral wall portion of the disk wall 2A of the front cover 2. The lockup facing member 20 is arranged so as to face each of the nuts 7 disposed on the front side of the outer peripheral wall portion of the disk wall 2A.

An operation of the T/C 1 of the first embodiment will be explained hereinafter. When the engine is stopped and a parking range is selected with a selector device (not shown), the starter motor 10M is actuated to rotate by turning on an ignition switch. The rotational driving force of the starter motor 10M is transmitted to the starter ring gear 10G via the teeth meshing with the pinion lop mounted to the output shaft of the starter motor 10M. The converter cover 6 and the starter ring gear 10G connected therewith are driven to make a unitary rotation. The rotation of the converter cover 6 is transmitted to the engine crankshaft 8 via the nuts 7 and the drive plate 9. The engine crankshaft 8 is thus driven to rotate.

After the engine starts, the starter motor 10M stops by turning off the ignition switch. In this state, the rotational driving force of the engine is transmitted to the front cover 2 via the drive plate 9 and the nuts 7, causing the converter cover 6 to rotate. Then, a drive range is selected with the selector device. A brake pedal is released, and an accelerator is depressed, so that the vehicle can start. In the engine start-up or low-speed running condition, the engine is kept rotated at low speed. In such an engine operating condition, a lubricating fluid passage 25 formed within the rotating shaft 16 is supplied with a lubricating fluid having a pressure slightly higher than a pressure of a lubricating fluid filled in a lockup chamber 27 disposed on the rear side of the lockup piston 18. The lockup chamber 27 accommodates the pump impeller 11 and the turbine runner 12. Owing to the difference between the fluid pressure within the lubricating fluid passage 25 and the fluid pressure within the lockup chamber 27, the lubricating fluid within the lubricating fluid passage 25 is introduced into a release chamber 26 formed between the disk wall 2A of the front cover 2 and the lockup piston 18. The lubricating fluid then flows from the release chamber 26 into the lockup chamber 27 via a throttled passage formed between an outer circumferential surface of the lockup piston 18 and the inner circumferential surface of the cylindrical wall 2B of the front cover 2. As a result, the fluid pressure within the release chamber 26 becomes larger than the fluid pressure within the lockup chamber 27, so that the lockup piston 18 is moved to a release position shown in FIG. 1. In the release position, the lockup facing member 20 of the lockup piston 18 is kept rearward apart from the planar surface 21 of the disk wall 2A of the front cover 2.

When the engine is rotated at the low speed under condition that the lockup piston 18 is placed in the release position, the rotational driving force of the engine is transmitted to the front cover 2 via the drive plate 9 and the nuts 7 and then the rear cover 5 connected with the front cover 2. The pump impeller 11 inside the rear cover 5 is driven to rotate and convert the rotational driving force to a kinetic energy of the fluid filled in the converter cover 6. The turbine runner 12 is driven to rotate by the kinetic energy of the fluid, so that the rotational driving force is transmitted to the rotating shaft 16 via the turbine hub 12A and inputted to the A/T 3. At this time, the rotational driving force of the converter cover 6 is transmitted to the oil pump 4B of the A/T 3 via the cylindrical portion 5A of the inner member 5C of the rear cover 5.

When the engine speed increases and a speed ratio between the pump impeller and the turbine runner 12 (the revolution number of an output shaft/the revolution number of an input shaft) becomes close to one, a transmission control apparatus, not shown, generates a lockup command for operating the lockup piston 18 in the lockup state. The fluid pressure within the lubricating fluid passage 25 of the rotating shaft 16 is reduced based on the lockup command. This causes the lubricating fluid filled in the release chamber 26 to return to the lubricating fluid passage 25, so that the pressure within the release chamber 26 becomes smaller than the pressure within the lockup chamber 27. The lockup piston 18, therefore, is forward moved to a lockup position in which the lockup facing member 20 is urged onto the planar surface 21 of the rear side of the outer peripheral wall portion of the disk wall 2A of the front cover 2. In this state, a friction force is produced between the lockup facing member 20 and the planar surface 21. Therefore, the rotational driving force of the front cover 2 is positively and directly transmitted to the rotating shaft 16 via the lockup piston 18 and the turbine hub 12A.

When the engine speed decreases and the speed ratio between the pump impeller and the turbine runner 12 becomes smaller than one, the transmission control apparatus generates a release command for operating the lockup piston 18 in the release state. The fluid pressure within the lubricating fluid passage 25 of the rotating shaft 16 is increased based on the release command. As a result, the lockup piston 18 is rearward moved again to the release position.

The starter ring gear 10G is rigidly connected with the front cover 2 by producing the plastic flow of metal at the corner portion between the disk wall 2A and the cylindrical wall 2B of the front cover 2 as described above. The plastic flow of metal enters into the circumferential recess 10D of the starter ring gear 10G to thereby form the circumferential projection 2E on the cylindrical wall 2B which firmly engages in the circumferential recess 10D. Therefore, the connection of the starter ring gear 10G with the front cover 2, according to the invention, can be provided without welding as described above in the related art. This can prevent the teeth 10B of the starter ring gear 10G from being deteriorated in rigidity due to annealing which is caused by heat during the welding operation. The teeth 10B of the starter ring gear 10G, therefore, can less suffer from abrasion caused due to meshing with the pinion 10P mounted to the output shaft of the starter motor 10M. This serves for prolonging the life of the starter ring gear 10G. Furthermore, the plastic flow of metal can be instantaneously caused by press forming, serving for reducing the time required for forming the connection between the starter ring gear 10G and the front cover 2.

Further, the circumferential recess 10D of the starter ring gear 10G is formed in the offset position which is axially offset from the plane C extending perpendicular to the rotation axis through a mid-point of the width, to the side of the disk wall 2A of the front cover 2. With this arrangement of the circumferential recess 10D, the downward stroke of the punch 33 can be reduced upon producing the plastic flow of metal of the corner portion between the disk wall 2A and the cylindrical wall 2B. In addition, a local area where the plastic flow of metal of the front cover 2 is produced can be limited to a small area, whereby deterioration of the rigidity of the front cover 2 can be prevented. The engaging member of the starter ring gear 10G is not limited to the circumferential recess 10D, but may be formed of a plurality of recesses circumferentially spaced by a predetermined distance from each other.

Figure 3A:
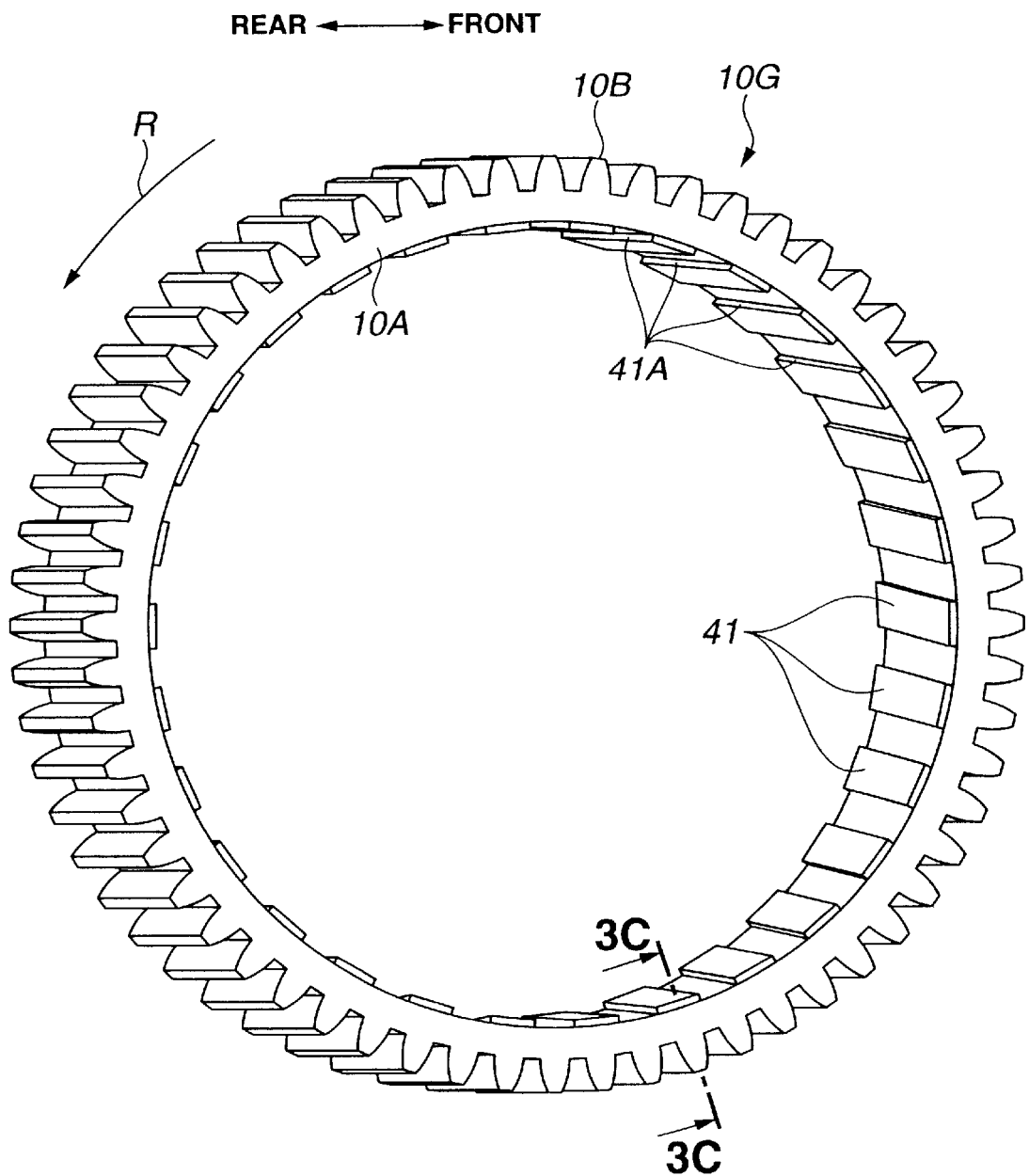
FIG. 3A is a perspective view of the starter ring gear used in a second embodiment, showing projections on an inner circumferential surface of the starter ring gear.

Referring to FIGS. 3A–3D, a second embodiment of the invention will be explained hereinafter, which differs in that the starter ring gear 10G having a helical-geared inner circumferential surface is connected with the front cover 2 by press-fitting, from the first embodiment. Like reference numerals denote like parts, and therefore, detailed explanations therefor are omitted. In the second embodiment, the starter ring gear 10G is made of metal having a larger rigidity than a rigidity of metal of the cylindrical wall 2B of the front cover 2. As illustrated in FIG. 3A, the ring portion 10A of the starter ring gear 10G has a helical-geared inner circumferential surface which is formed with a plurality of projections 41. The projections 41 act as the engaging member which is engaged in the outer circumferential surface of the cylindrical wall 2B of the front cover 2 to connect the starter ring gear 10G with the front cover 2. The projections 41 extend radially inward from the inner circumferential surface of the ring portion 10A in a circumferentially spaced relation to each other. An imaginary inner circumferential surface formed by top surfaces of the projections 41 has a diameter smaller than the outer diameter of the cylindrical wall 2B of the front cover 2. Each projection 41 has a slant side surface 41A which is located on the fore side thereof in the direction R of rotation of the starter ring gear 10G.

Figure 3B:
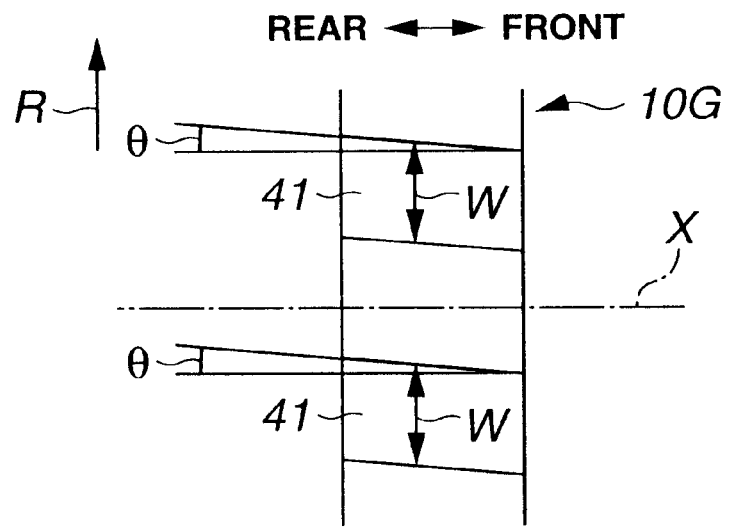
FIG. 3B is a schematic enlarged development of the starter ring gear of FIG. 3A, showing the projections.
Figure 3C:
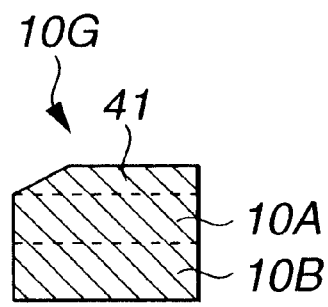
FIG. 3C is a cross-section taken along line 3C—3C of FIG. 3A.

As shown in FIG. 3B, the slant side surface 41A is inclined relative to the rotation axis X, namely, the axis of the starter ring gear 10G, such that the projection 41 is forced to be engaged or bite into the outer circumferential surface of the cylindrical wall 2B of the front cover 2 when the starter ring gear 10G is rotated in a direction R by the starter motor 10M. Namely, an inclination angle θ of the slant side surface 41A is preset so as to generate a rearward component of force which acts on the slant side surface 41A when the starter ring gear 10G is rotated. A width W of each projection 41 which extends in a circumferential direction of the starter ring gear 10G, is kept constant at any portion. As shown in FIG. 3C, each projection 41 is chamfered on the inner rear side so that the press-fitting operation of the starter ring gear 10G can be readily performed.

Figure 3D:
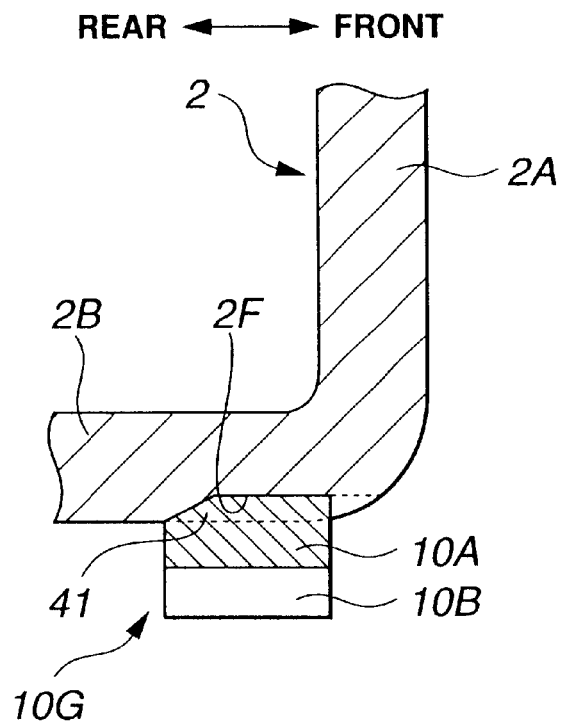
FIG. 3D is a fragmentary enlarged cross-section of the connection between the starter ring gear and the converter cover in the second embodiment.

FIG. 3D illustrates the connection between the starter ring gear 10G and the cylindrical wall 2B of the front cover 2. As illustrated in FIG. 3D, each projection 41 of the starter ring gear 10G is engaged in recess 2F formed in the outer circumferential surface of the cylindrical wall 2B. The recesses 2F are circumferentially spaced from each other. The recesses 2F are formed upon press-fitting the starter ring gear 10G onto the cylindrical wall 2B of the front cover 2.

An operation of connecting the starter ring gear 10G with the cylindrical wall 2B of the front cover 2 in the second embodiment is performed in the following manner. The starter ring gear 10G is set on the front end of the cylindrical wall 2B such that a rear end face of the starter ring gear 10G is opposed to the front outer periphery of the cylindrical wall 2B. Next, the starter ring gear 10G is rearward driven or hammered to fit onto the cylindrical wall 2B by press-fitting. During the press-fitting operation, the projections 41 of the starter ring gear 10G are forced to engage or bite into the metal of the outer circumferential surface of the cylindrical wall 2B. A plastic flow of the metal at the corner portion between the disk wall 2A and the cylindrical wall 2B is produced so that the metal is pushed away to enter into recessed regions between the projections 41 of the starter ring gear 10G. Thus, the recesses 2F are formed corresponding to the projections 41 in the outer circumferential surface of the cylindrical wall 2B near the corner portion. Upon finishing the press-fitting operation, the starter ring gear 10G and the cylindrical wall 2B of the front cover 2 are integrally connected through the engagement between the projections 41 and the recesses 2F.

When the starter ring gear 10G is rotated in the direction R shown in FIG. 3A by the starter motor 10M for initiating the engine, the rotational driving force acts on the slant side surface 41A of each projection 41 as follows. A component of the rotational driving force of the starter ring gear 10G is generated by the contact between the slant side surface 41A and the corresponding slant surface of each recess 2F opposed to the slant side surface of the projection 41. The component of the rotational driving force forces the starter ring gear 10G in the direction of press-fitting, namely, rearward. This enhances the engagement of the projection 41 in the outer circumferential surface of the cylindrical wall 2B. The starter ring gear 10G, therefore, can be prevented from being forward displaced and removed from the cylindrical wall 2B.

As explained above, the starter ring gear 10G is integrally connected with the front cover 2 of the T/C 1 of the second embodiment by not welding but press-fitting. Therefore, similar to the first embodiment, the teeth 10B of the starter ring gear 10G can be prevented from annealing caused due to the welding heat to thereby prevent the deterioration in rigidity thereof. This can reduce the abrasion of the teeth 10B of the starter ring gear 10G which is caused by meshing with the pinion 10P mounted to the starter motor 10M. The life of the starter ring gear 10G can be prolonged. Further, the connection of the starter ring gear 10G with the front cover 2 can be instantaneously performed merely by press-fitting, so that the machining time required for providing the connection therebetween can be reduced.

Figure 3E:
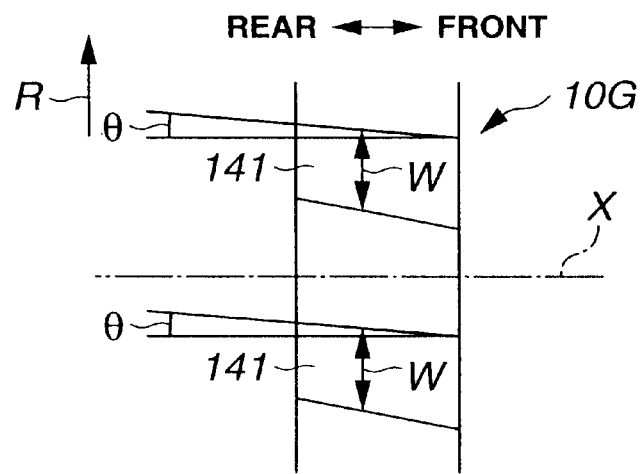
FIG. 3E is a diagram similar to FIG. 3B, but showing modification of the projections of the second embodiment.
Figure 4:
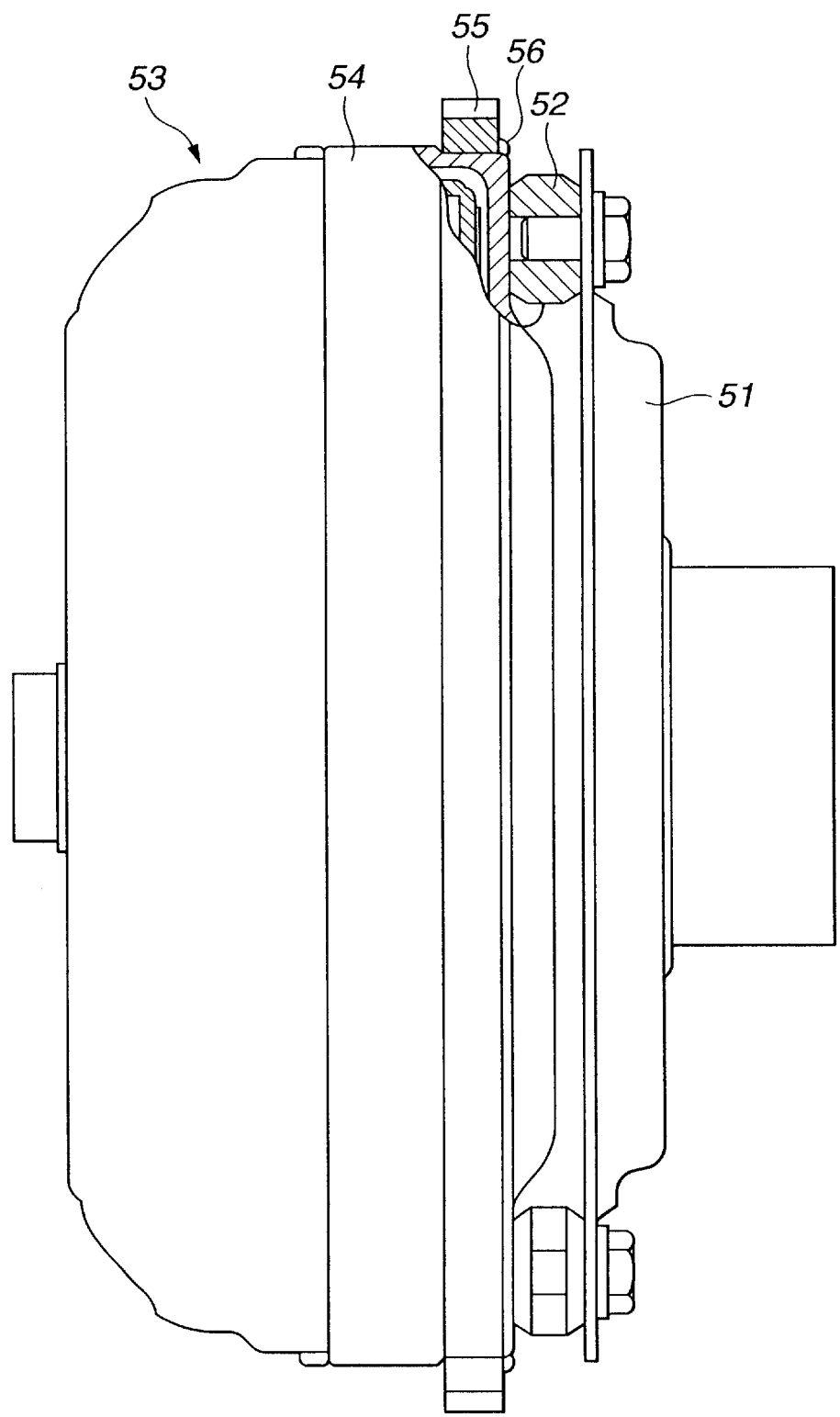
FIG. 4 is a side view, partial cross-section, of the connecting structure of a related art.

FIG. 3E illustrates a modification of the projections 41 formed on the inner circumferential surface of the starter ring gear 10G of the second embodiment. As illustrated in FIG. 3E, similar to the projections 41 of the first embodiment, the modified projections 141 each has the slant side surface which is located on the fore side thereof in the direction R of rotation of the starter ring gear 10G and inclined relative to the rotation axis X by the preset inclination angle θ. An opposite side surface of each projection 141, which is located on the rear side thereof in the direction R of rotation of the starter ring gear 10G, has an inclination angle relative to the rotation axis X which is preset such that the circumferentially extending width W of the projection 141 gradually decreases in the rearward direction. Namely, the projections 141 have a generally triangular shape tapered toward a rear end thereof. Owing to the rearward decreasing width of the projections 141, the press-fitting operation of the starter ring gear 10G onto the cylindrical wall 2B of the front cover 2 can be facilitated.

Meanwhile, the rotation drive source is not limited to the engine described in the first and second embodiments, but may be applied to an internal combustion engine and other rotation drive sources which must be initiated by a starter motor.

This application is based on prior Japanese Patent Application No. 2001-303921 filed on Sep. 28, 2001, the entire content of which is hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A method of connecting a starter ring gear with a converter cover within a torque converter, the starter ring gear being adapted for initiating a rotation drive source for the torque converter and rotatable about a rotation axis, the starter ring gear including a first engaging member disposed on an inner circumferential surface of the starter ring gear, the converter cover being rotatable about the rotation axis together with the starter ring gear, the converter cover including a cylindrical wall extending along the rotation axis, a disk wall connected with an axial end of the cylindrical wall to form a corner portion therebetween, and a second engaging member which is engaged with the first engaging member and disposed on an outer circumferential surface of the cylindrical wall, the method comprising:

setting the starter ring gear at the corner portion between the disk wall and the cylindrical wall of the converter cover in alignment with each other; and producing a plastic flow of metal at the corner portion between the disk wall and the cylindrical wall of the converter cover, the plastic flow of metal forming the second engaging member engaged with the first engaging member, to thereby connect the starter ring gear with the converter cover.

2. The method as claimed in claim 1, wherein the first engaging member comprises a circumferential recess circumferentially extending along the inner circumferential surface of the starter ring gear, the second engaging member comprising a circumferential projection extending radially outward from the outer circumferential surface of the cylindrical wall of the converter cover and circumferentially therealong, the producing operation comprising pressing the corner portion between the disk wall and the cylindrical wall in the direction of the rotation axis to force the plastic flow of metal into the circumferential recess of the starter ring gear and form the circumferential projection of the cylindrical wall.

3. The method as claimed in claim 2, wherein the circumferential recess of the starter ring gear is located axially offset from a plane extending perpendicular to the rotation axis through a mid-point of an axially extending width of the starter ring gear, to the side of the disk wall, the setting operation comprising fitting the starter ring gear onto the cylindrical wall of the converter cover such that the circumferential recess is opposed to the outer circumferential surface of the cylindrical wall near the corner portion.

4. The method as claimed in claim 1, wherein the first engaging member comprises a plurality of projections which extend radially inward from the inner circumferential surface of the starter ring gear in a circumferentially spaced relation to each other, the second engaging member comprising a plurality of recesses formed in the outer circumferential surface of the cylindrical wall of the converter cover in a circumferentially spaced relation to each other, the producing operation comprising press-fitting the starter ring gear onto the cylindrical wall of the converter cover to engage the plurality of projections in the outer circumferential surface of the cylindrical wall of the converter cover and form the plurality of recesses in the outer circumferential surface of the cylindrical wall of the converter cover.

5. The method as claimed in claim 4, wherein each of the projections has a slant side surface inclined relative to the rotation axis so as to generate a component of a rotational driving force of the starter ring gear which forces the starter ring gear in the direction of the press-fitting operation.

6. The method as claimed in claim 5, wherein the plurality of projections have a constant width which extends in a circumferential direction of the starter ring gear.

7. The method as claimed in claim 5, wherein the plurality of projections have a width which extends in a circumferential direction of the starter ring gear and gradually decreases in the direction of the press-fitting operation.

8. The method as claimed in claim 1, wherein the starter ring gear is made of metal having a larger rigidity than a rigidity of metal of the cylindrical wall of the converter cover.

9. A torque converter in connection with a rotation drive source, the torque converter including a starter ring gear adapted for initiating the rotation drive source and rotatable about a rotation axis, the starter ring gear including a first engaging member disposed on an inner circumferential surface of the starter ring gear, and a converter cover rotatable about the rotation axis together with the starter ring gear, the converter cover including a cylindrical wall extending along the rotation axis, a disk wall connected with an axial end of the cylindrical wall to form a corner portion therebetween, and a second engaging member which is engaged with the first engaging member and disposed on an outer circumferential surface of the cylindrical wall, the starter ring gear being connected with the converter cover by a method comprising:

setting the starter ring gear at the corner portion between the disk wall and the cylindrical wall of the converter cover in alignment with each other; and producing a plastic flow of metal at the corner portion between the disk wall and the cylindrical wall of the converter cover, the plastic flow of metal forming the first engaging member engaged with the second engaging member, to thereby connect the starter ring gear with the converter cover.

10. The torque converter as claimed in claim 9, wherein the first engaging member comprises a circumferential recess circumferentially extending along the inner circumferential surface of the starter ring gear, the second engaging member comprising a circumferential projection extending radially outward from the outer circumferential surface of the cylindrical wall of the converter cover and circumferentially therealong, the producing operation comprising pressing the corner portion between the disk wall and the cylindrical wall in the direction of the rotation axis to force the plastic flow of metal into the circumferential recess of the starter ring gear and form the circumferential projection of the cylindrical wall.

11. The torque converter as claimed in claim 10, wherein the circumferential recess of the starter ring gear is located axially offset from a plane extending perpendicular to the rotation axis through a mid-point of an axially extending width of the starter ring gear, to the side of the disk wall, the setting operation comprising fitting the starter ring gear onto the cylindrical wall of the converter cover such that the circumferential recess is opposed to the outer circumferential surface of the cylindrical wall near the corner portion.

12. The torque converter as claimed in claim 9, wherein the first engaging member comprises a plurality of projections which extend radially inward from the inner circumferential surface of the starter ring gear in a circumferentially spaced relation to each other, the second engaging member comprising a plurality of recesses formed in the outer circumferential surface of the cylindrical wall of the converter cover in a circumferentially spaced relation to each other, the producing operation comprising press-fitting the starter ring gear onto the cylindrical wall of the converter cover to engage the plurality of projections in the outer circumferential surface of the cylindrical wall of the converter cover and form the plurality of recesses in the outer circumferential surface of the cylindrical wall of the converter cover.

13. The torque converter as claimed in claim 12, wherein each of the projections has a slant surface inclined relative to the rotation axis so as to generate a component of a rotational driving force of the starter ring gear which forces the starter ring gear in the direction of the press-fitting operation.

14. The torque converter as claimed in claim 13, wherein the plurality of projections have a constant width which extends in a circumferential direction of the starter ring gear.

15. The torque converter as claimed in claim 13, wherein the plurality of projections have a width which extends in a circumferential direction of the starter ring gear and gradually decreases in the direction of the press-fitting operation.

16. The torque converter as claimed in claim 9, wherein the starter ring gear is made of metal having a larger rigidity than a rigidity of metal of the cylindrical wall of the converter cover.

* * * * *